United States Patent [19]

Lombardi et al.

[11] 4,217,584
[45] Aug. 12, 1980

[54] SYSTEM FOR THE SUPPRESSION BY MATCHING TECHNIQUES OF UNWANTED ECHOES IN IMPULSE COHERENT RADARS

[76] Inventors: Paolo Lombardi, Viale del Ciclismo, 10, Rome, Italy, 00144; Gaspare Galati, via Pisino, 151, F2/C/15, Rome, Italy, 00177

[21] Appl. No.: 926,751

[22] Filed: Jul. 21, 1978

Related U.S. Application Data

[63] Continuation of Ser. No. 806,865, Jun. 15, 1977, abandoned.

[30] Foreign Application Priority Data

Jun. 15, 1976 [IT] Italy ............................... 49953 A/76

[51] Int. Cl.$^2$ ........................... G01S 9/42; G01S 9/02
[52] U.S. Cl. ..................................... 343/7.7; 343/7 A
[58] Field of Search ................................. 343/7 A, 7.7

[56] References Cited

U.S. PATENT DOCUMENTS

| | | | |
|---|---|---|---|
| 3,882,498 | 5/1975 | McGuffin | 343/7.7 |
| 3,993,994 | 11/1976 | Goggins | 343/7 A |
| 3,995,271 | 11/1976 | Goggins, Jr. | 343/7 A |
| 4,031,364 | 6/1977 | Wilmot | 343/7 A |

Primary Examiner—S. C. Buczinski
Attorney, Agent, or Firm—Holman & Stern

[57] ABSTRACT

Disclosed is a method for the suppression by complex conjugate cancellation of unwanted radar echoes caused both by obstacles stationary with respect to the radar transmitter as well as obstacles having a relative speed with respect to the radar transmitter. Cancellation is achieved by the use of a conventional type cancelling operator with at one input a constant weight equal to 1 and at the other input a weight variable in such a way as to make the frequency response of the cancelling operator equal to zero instant-by-instant for a Doppler frequency equal to the average frequency of the unwanted echoes.

4 Claims, 5 Drawing Figures

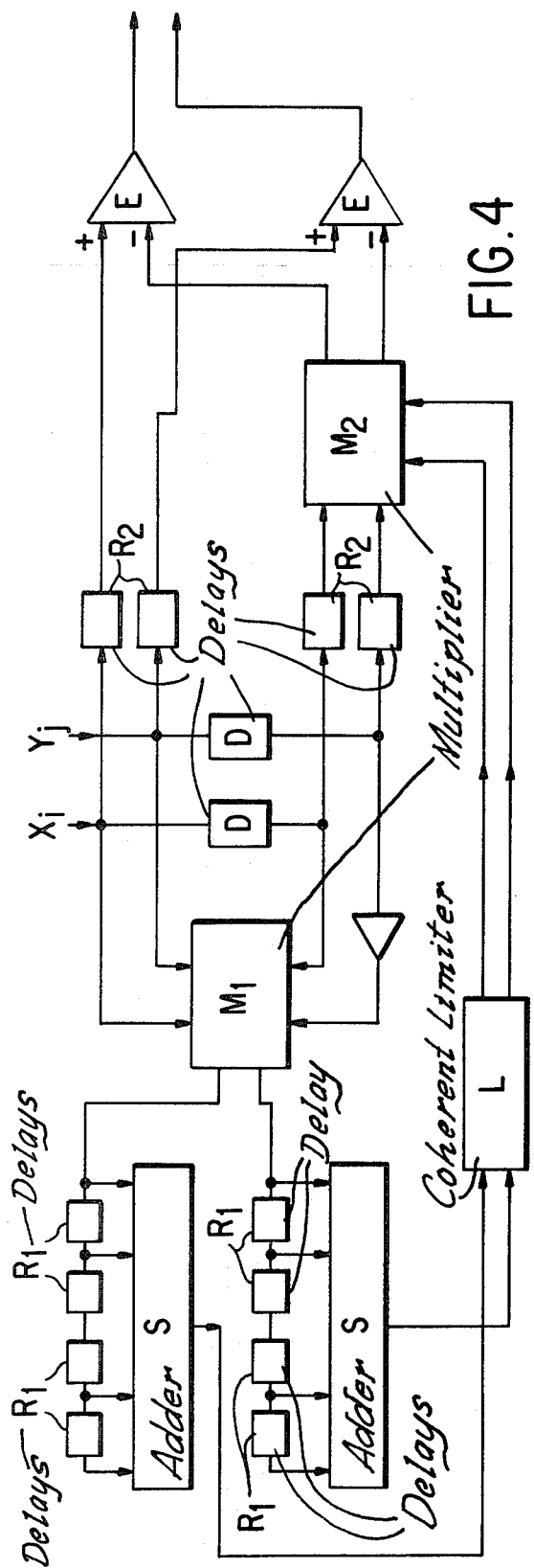
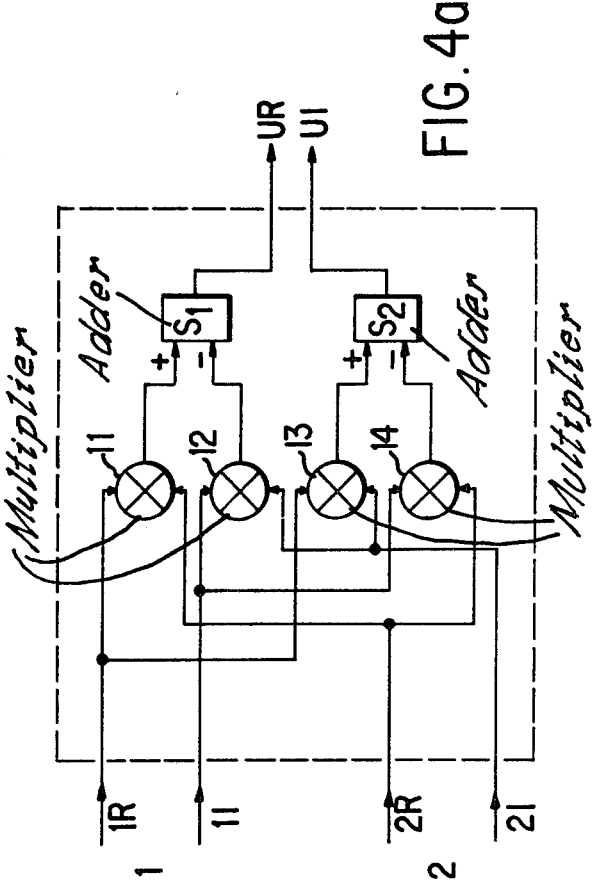
FIG.4
FIG.4a

SYSTEM FOR THE SUPPRESSION BY MATCHING TECHNIQUES OF UNWANTED ECHOES IN IMPULSE COHERENT RADARS

This is a continuation of application Ser. No. 806,865, filed June 15, 1977, now abandoned.

This invention regards a system for the suppression, by matching techniques, of unwanted echoes in impulse coherent radars. More particularly, this invention involves a system through which the erasing of unwanted echoes can be carried out by matching techniques, where these echoes are caused by obstacles moving at a certain relative speed with respect to the radar. The totality of these unwanted echoes, caused for example by reflections from the terrain, the sea, rain, etc., will be referred to as clutter.

The problem of erasing clutter in radar installations has generally been addressed in earlier techniques through the use of MTI (Moving Target Indicator) cancelling operators hereinafter referred to as erasers. These are indicators of moving targets that are nothing but filters, whose parameters are determined once and for all during the design stage.

The functioning of those erasers is based on the analysis of the Doppler signal obtained from the radar echo and from a coherent generator. The design of conventional MTI's is usually done in such a way that the frequency response is zero when the Doppler frequency is zero, which leads to the erasure only of those unwanted echoes which are due to obstacles that are not moving in respect to the radar.

Generally, however, there emerges as an important problem the erasure also of those echoes which are due to obstacles that are moving in respect to the radar, such as in typical cases echoes caused by rain, sea, chaff, etc. Under these conditions an MTI of this fixed weight type is not capable of delivering acceptable average rates of improvement for the signal/clutter ratio. To solve the first of these problems there has been developed the AMTI (Airborne Moving Target Indicator) system, as indicator of moving targets for mobile platform radars. In these erasers the relative speed of the mobile platform is compensated for by varying the frequency of the coherent oscillator in such a way as to have a zero Doppler frequency for fixed obstacles.

In the AMTI the frequency of the coherent oscillator can change at most once for each sweep. Thus if during the same sweep terrain clutter and rain clutter are present at different distances, the AMTI permits an effective erasure of the stronger clutter and a poor erasure of the rest. For the case of a stationary radar and moving clutter no satisfactory solutions have so far been found within the framework of erasure using the MTI. Instead, other techniques have been used (for example, batteries of Doppler filters) which however involve an excessive circuit complexity. To eliminate the disadvantages mentioned so far, a system has been developed based on the invention to be described, the basic purpose of which is to allow the erasure of unwanted echoes caused both by obstacles that are stationary in respect to the radar as well as by obstacles having a relative speed not equal to zero.

To reach the goal a system has been proposed which is made up of a conventional type eraser with at one input a constant weight equal to 1 and at the other input a weight that is varied by matching. That is to say, this weight is variable in such a way as to make the eraser's frequency response equal to zero from one instant to the next for a Doppler frequency value equal to the average frequency of the unwanted echoes.

BRIEF DESCRIPTION OF THE DRAWINGS

The functioning of this system will become clear through the following description and with the help of the figures, as follows:

FIG. 4 represents a block diagram similar to FIG. 2, but takes into account the complex nature of the incoming radar signal, and shows the operators which act on the two components, phase and frame, of the signal itself.

FIG. 4a represents a detailed block diagram of the complex multiplier of FIG. 1. In order to make the functioning of the circuit more understandable, we now include a short mathematical introduction concerning the main magnitudes involved in the working of the circuit itself.

DETAILED DESCRIPTION OF A PREFERRED EMBODIMENT

To obtain an estimate of the average Doppler frequency of the clutter $f_D$ or, in other words, of the Doppler phase $\Phi_D = 2\pi f_o T$ (T=repetition time), it suffices to consider the clutter voltages for two successive sweeps, even if the erasure involves more than two sweeps. Thus, indicating with $V_1$ and $V_2$ the complex video voltages, separated by a repetition time, at the input to the MTI, we obtain $E[V_1^* V_2] = \rho_1 C^2 e^{j\Phi_D}$ where $C^2$ = the average rating of the clutter
$\rho^i$ = the correlation coefficient
$V_1^*$ = the complex conjugated value of $V_1$
$E[V_1^* V_2]$ = the estimated value of the product $V_1^* V_2$.

We can obtain the Doppler phase with the operation:

$$\frac{E[V_1^* V_2]}{|E[V_1^* V_2^*]|} = e^{j\Phi_D} \qquad (1)$$

Therefore to find the Doppler phase $\Phi_D$, or more precisely the complex number $e^{j\Phi_D}$ it is necessary to have an estimate of the complex quantity $V_1^* V_2$. This can be done for a clutter spread over a wider area by setting an average distance. The estimate of the complex number must be based on a necessarily limited number of range cells, so that there occurs a fluctuating time error which creates a loss of improvement in the signal/clutter ratio compared with a non-matching eraser working with clutter at an average Doppler frequency equal to zero. From the tests that have been carried out, it has been determined that this loss is very small and specifically turns out to be less than 1,2 dB for values of the correlation coefficient between 0.95 and 0.995.

We see that in the case of a simple eraser, the weights needed to bring the zero of its frequency response to the frequency $f_D$ are 1 and $-e^{j2\pi f_o T}$. In fact, adopting these weights, the output signal $V_u(f)$ of the eraser and the input signal $V_i(f)$ are linked by the following equation:

$$V_u(f) = V_i(f)[1 - \exp(-j2\pi(f-f_D)T)]$$

from which derives $$\frac{V_u(f)}{V_i(f)} = 1 - \exp(j2\pi(f-f_D)T)$$

and also $$\frac{V_u(f)}{V_i(f)} = 2[scu\ \pi(f-f_D)T]$$

which coincides with the frequency response of the simple eraser with weights of 1 and −1 centered on the frequency $f_D$.

Figure 2:
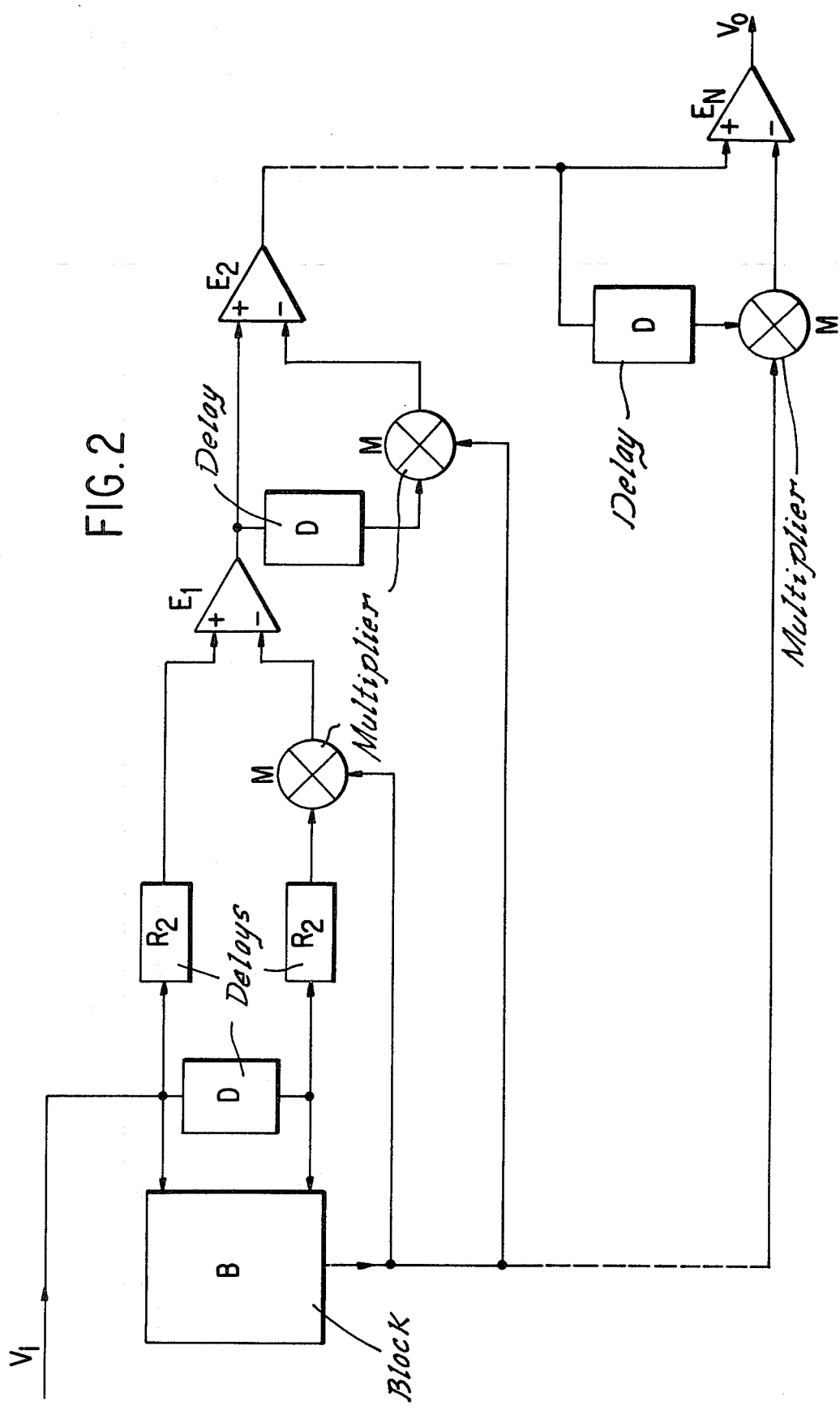
FIG. 2 is a block diagram similar to FIG. 1 in which the method of using multiple erasers is illustrated.

It is possible, as shown in FIG. 2 to obtain a multiple eraser with the zeroes of its frequency response centered on the frequency $f_D$, simply by setting up several simple erasers in cascade connection, each of them with the zero centered on the frequency $f_D$.

Figure 1:
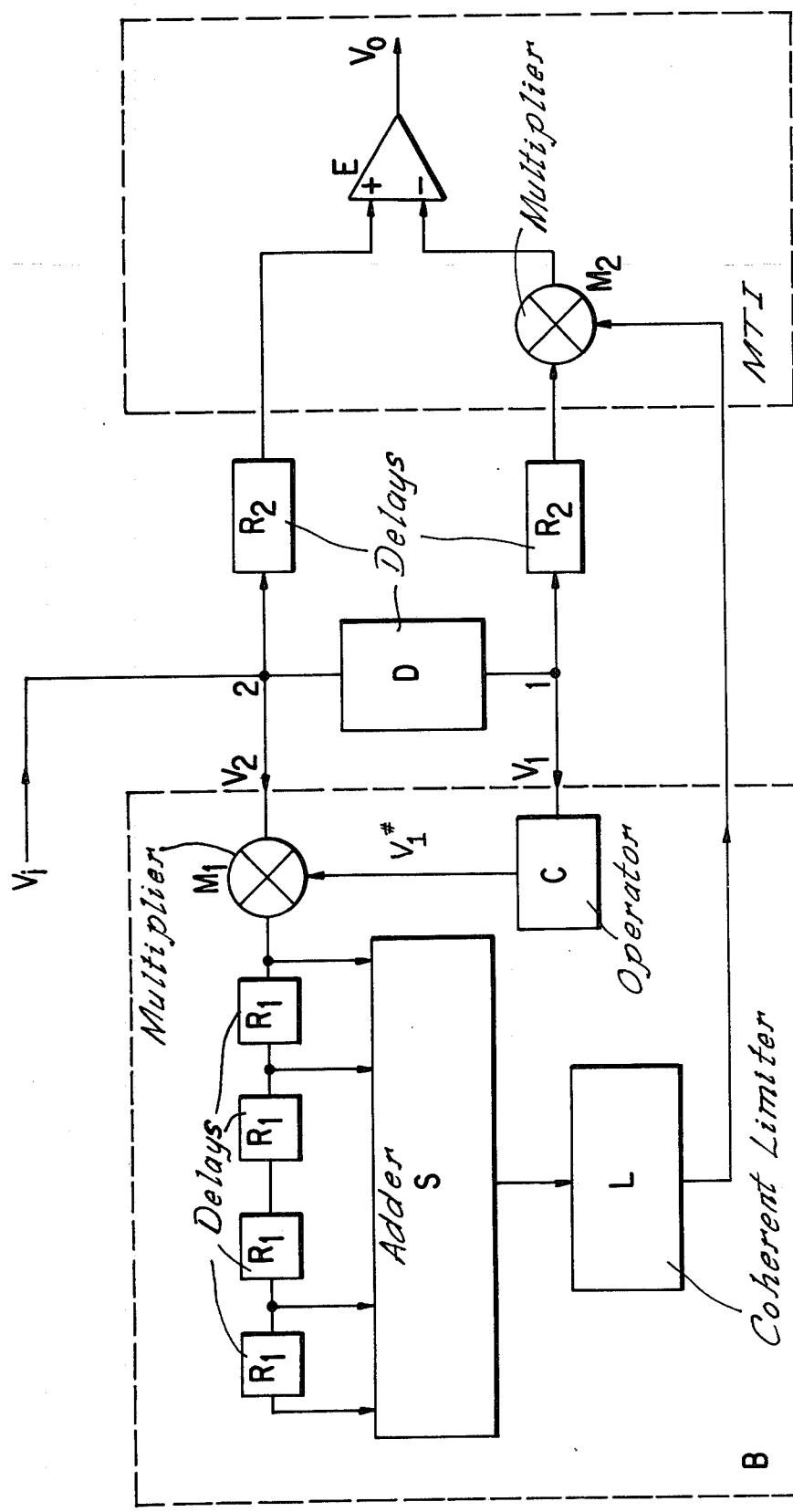
FIG. 1 is a block diagram of the system incorporating the invention, and makes possible a simple illustration of how it functions.

Referring now to FIG. 1, we describe in greater detail the workings of the system incorporatng the invention.

The incoming complex video signal $V_i$ is fed into circuit D, which introduces a delay T equal to the repetition time. Therefore at branch points 1 and 2 signals $V_1$ and $V_2$ respectively will be present at the same time, which represent the incoming signal from two successive sweeps.

The operator C transforms the complex signal $V_1$ into its conjugate $V_1^*$, which is brought to the input of the multiplier $M_1$, at the other input of which is present the signal $V_2$. The multiplier will then emit the outgoing complex signal $V_1^* V_2$ which, as already has been noted (see equation 1), permits us to find the Doppler phase.

The output from the multiplier $M_1$ is connected with a series of delay circuit $R_1$, each of which creates a delay equal to the breadth of the range resolution cell. In the figure, merely for purposes of an example, there appear four delay circuits $R_1$.

At the output from the multiplier and the $M_1$ circuits are available the values of the product $V_1^* V_2$, regarding successive range resolution cells. The weight estimate is carried out by adding, by means of the adder S, the signals indicated as $V_1^* V_2$, with the exception of the one which is located at the output of the second delay circuit $R_1$, for a reason which will be explained later.

The output of this operator S is normalized at a value of 1 by means of a coherent limiter L which thus provides the estimated value $e^{j\Phi D}$. The eraser element E by means of the delay circuit $R_2$ receives at one input the delayed signal $V_2$ with a delay equal to $2\tau$, or in other words twice the breadth of the range resolution cell. The signal $V_1$ arrives at the second input E, after this signal has been delayed for a time $2\tau$ by a second delay circuit $R_2$ and weighted with the factor $e^{j\Phi D}$ by means of the multiplier $M_2$.

Because of the presence of the delays $R_2$ the eraser E operates on video signals coming from two successive sweeps, whose arrival at the input has preceded by a time $2\tau$ the present signal $V_i$.

It must be noted that it is necessary to avoid obtaining the weight applied to the multiplier $M_2$ by using the video signal which is contemporaneous with the one present at the eraser input that is weighted as 1, because this would lead to a partial erasure of the useful signal as well.

For this reason the signal which is leaving the central circuit of the chain of delays $R_1$, and which is delayed to the same extend as the signal which is going through the delays $R_2$, is not, as has been mentioned, sent to the adder S and therefore does not make up part of the weight $e^{j\Phi D}$, thus avoiding the undesired erasure effect already pointed out.

For the case in which the number of cells $R_1$ is not four, as we assumed in FIG. 1 for purposes of illustration, but has the general value of n, the delay introduced by each of the circuits $R_2$ must be equal to $(n/2)\tau$. In fact, as has already been pointed out, to avoid the partial erasure of the useful signal it is always necessary for the delay introduced by $R_2$ to be equal to half of the delay introduced by the whole chain of circuits $R_1$.

Figure 3:
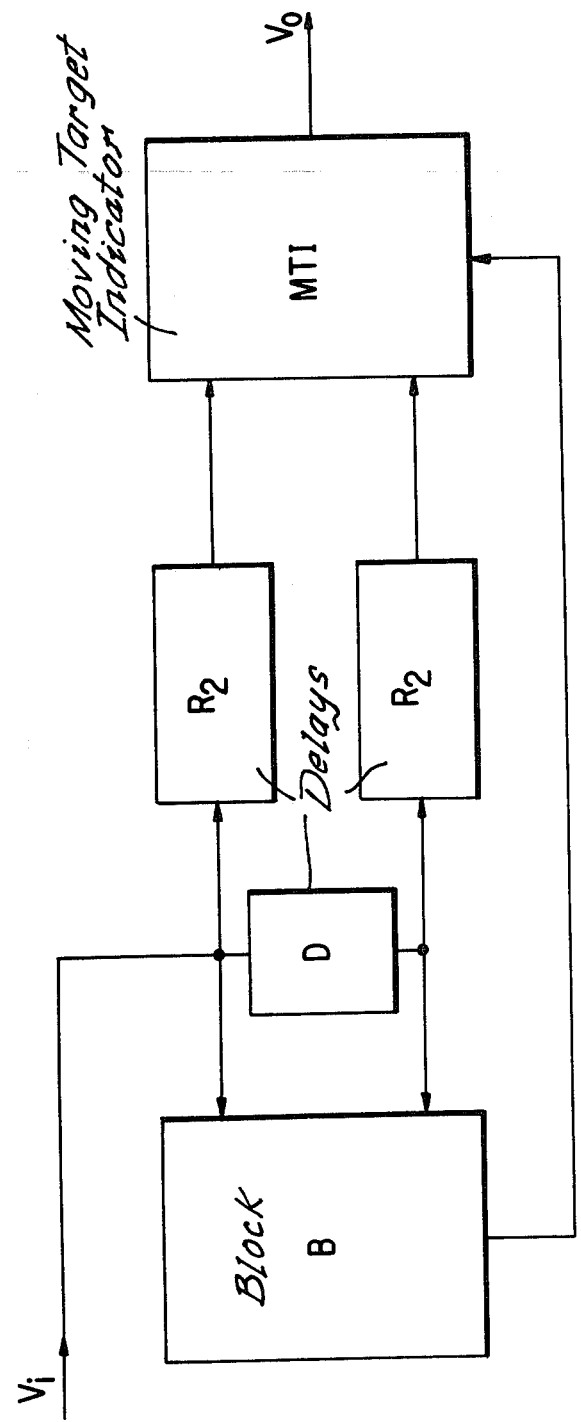
FIG. 3 shows a block diagram of the system incorporating the invention in which erasure is carried out through a recursive MTI of conventional type.

FIG. 3 illustrates a different version of the diagram of FIG. 1 using an N-level matching eraser made up of a cascade series of N individual erasers, each having a matching weight equal to that provided by the single estimate block B.

In yet another version the eraser can be replaced with a recursive MTIA with weights dependent on the estimated $f_D$ so as to bring the zero of the frequency response of the MTI to the value of this $f_D$. A block diagram of this version is given in FIG. 3.

We must note at this point that FIGS. 1, 2 and 3 represent only outlines of the principle involved since these figures, for greater simplicity of description, do not show the electrical signals as being made up of the two components, real and imaginary, which is reality are present, since we are dealing here with complex magnitudes.

FIG. 4 therefore represents a block diagram similar to that of FIG. 1 which shows instead the circuit structure necessary for working on the two components of the signal that have been mentioned.

In this figure we have used the same annotations as in FIG. 1 to indicate operators that are carrying out similar functions.

As regards FIG. 4, we have indicated with the symbols $x_i$ and $y_i$, respectively, the phase component and the frame component of the incoming video signal $V_i$.

Each of these components is delayed by a time of T, equal to the repetition time, by a delay circuit D.

The complex signal present at the input to the pair of circuits D will be indicated as $V_2$ and the signal at the output of these circuits will be designated as $V_1$, in conformity with the annotation of FIG. 1.

The imaginary component of the signal thus delayed has its sign changed by the inverter I and, together with the real component of the delayed signal, constitutes the signal $V_1^*$ conjugated with $V_1$. The signal $V_1^*$ is fed into the complex multiplier $M_1$, into which is also fed the incoming video signal in its two components, $x_i$ and $y_i$.

The phase and frame components of the signal $V_1^* $ and $V_2$ are present at the output from the multiplier. Each of these components is fed into a series of delay circuits $R_1$.

One circuit S adds up the sum of the phase components of the signals $V_1^* V_2$, which are present at the output of the multiplier $M_1$ and of the delays $R_1$. with the exception of the signal present at the output of the second delay. The reason for this has already been given.

Similarly, a second circuit S adds up the sum of the corresponding frame components of the delayed signals.

The two signals present at the outputs of the two adders make up, after the subsequent normalization carried out by the coherent limiter, the estimated value of $e^{j\Phi D}$, or in other words the matching weight in its two components. One of the two erasure elements E receives at one input a component of the signal $V_2$ delayed by circuit $R_2$ for a time $2\tau$ equal to twice the breadth of the range resolution cell. Into the other input of the same element E is fed the corresponding component of the outgoing signal from the complex multiplier $M_2$, into whose input are fed the components of $V_1$, each delayed by the delay circuits $R_2$ for a time $2\tau$ mentioned above. The second element E works in a similar way on the other signal component $V_2$ which in turn is also delayed by a further circuit $R_2$, as well as on the corresponding component of the outgoing signal from the multiplier $M_2$. It must be born in mind that the indicated delay circuits $R_2$ create a delay time equal to $2\tau$ when the number of relays $R_1$ is equal to four. As has already been said, whenever the number of delays is equal to n these delays $R_2$ will create a delay equal to $(n/2)\tau$.

Into the multiplier $M_2$ mentioned above are fed the two components of the estimated and normalized value of the signal $V_1^* V_2 = e^{j\Phi D}$ which therefore makes up the matching weight of the eraser.

The structure of the two complex multipliers $M_1$ and $M_2$ is illustrated in greater detail in FIG. 4a.

Here with the symbols 1R, 1I, 2R, 2I we indicate respectively the real and imaginary components of two signals which are subject to multiplication. With UR and UI we indicate the same components of the signal produced which is prevent in the output of the multiplier.

This multiplier is made up of four conventional multipliers (11, 12, 13 and 14). The first of these, 11, works on the two real components 1R and 2R of the incoming signals, while the second, 12, handles the two corresponding imaginary components 1I and 2I. The outputs of multipliers 11 and 12 are connected with the addition circuit S1, which is of conventional type, and which provides the real component UR of the outgoing signal of the complex multiplier.

Multiplier 13 gives the product of the real component 1R and the imaginary component 2I of the incoming signals while multiplier 14 gives the product of the components 1I, 2R of those signals.

The outgoing signals of multipliers 13 and 14 after the sum added up by the adder S2 makes up the imaginary component of the outgoing signal from the complex multiplier.

The system incorporating the invention in question depicted in FIG. 4 in its preferred version can be set up using digital components, with all the obvious advantages that this technique makes possible.

In a typical version using digital techniques we have employed four bits to represent the parts of the complex magnitudes involved in the functioning so as to keep the complexity of the circuitry within limits and without creating a significant reduction in the improvement of the signal/clutter ratio for the case of a single eraser.

If the use of a multiple eraser is desired, it may be appropriate to use a larger number of bits.

In the four bit version, we have used 5 printed circuit cards of 213.3 mm by 196.8 mm, each capable of holding up to 45 micorlogics to put together the part of the circuit that carries out the weight estimate (B).

We must at this point underline that all the operators, multipliers, adders, delays, inverters and erasers are of the most conventional type and well known to experts in the field. We have therefore not included any descriptions of them. As far as the coherent limiter is concerned, in the preferred version we have employed Programmable Read Only Memories (PROM). These are set up according to the input-output configuration that it is desired to obtain, writing in the memory cells which corresponds to the various input values the values of the desired output. In other words, the input is the address of a memory cell in which is written the corresponding output.

All the components required to set up the preferred version already described are widely-available and are generally manufactured on medium scale in integrated form (MSI) by such companies as Texas, Fairchild, and others.

The invention in question has been described and illustrated in a specific form of application, but it must be understood that this invention can be subjected to changes and substitutes both in components and in circuit logics without for that reason losing its established patent protection.

We claim:

1. A method for suppressing undesirable echoes in a pulse coherent radar, wherein the suppression of the undesirable echoes is carried out in an adaptive or matching manner, making use of a variable weight which is determined by processing the complex video signals relating to two successive scans, said method comprising the steps of:
   converting one scan to its conjugate complex;
   multiplying the conjugate of said one scan times the complex of the other scan;
   subdividing each range scan into plural range resolution cells;
   introducing an even number of successive delays, all of a size equal to the width of a resolution cell in distance;
   summing the contributions of signals delayed in each resolution cell with the exception of a signal to which there has been applied the number of said successive delays;
   normalizing to the value 1 the total signal obtained by summing the contributions of signal delayed in each of said resolution cells, said normalized signal comprising a weighting signal;
   multiplying said weighting signal times one scan and applying the resultant signal to one input of a canceller;
   applying the other scan with a weight of 1 to another input of the canceller;
   whereby the resultant canceller output signal is delayed by time equal to the width of said resolution cell multiplied by one-half of said even number of delays.

2. The method of claim 1 wherein said complex video signals relating to two successive scans are present simultaneously at the input and at the output of a delay element which introduces a delay equal to the period of repetition T of the radar.

3. A method according to claim 2, wherein said eraser has a plurality of single stages of cancellation connected together in cascade and the step of multiplying said weighting signal is applied to the signal in each stage.

4. The method according to claim 2, wherein said complex video signals have real and imaginary components which are applied respectively to two initial delay circuits, introducing a delay equal to the period of repetition, the outputs of which, after the inversion of the imaginary component carried out by an inverter, are applied to a pair of inputs of a first complex multiplier, to another pair of inputs of which there are applied the said real and imaginary components of the video input signal, the outputs of the said complex multiplier being connected respectively to a first and a second delay circuit and totalizing circuits, each of which operates by introducing successive delays equal to one another and equal to the width of the resolution cell in distance and then totalling the successive delayed signals except one which has a mean delay, the outputs of the said first and second delay circuits and totalizing circuits being sent to the two inputs of a coherent limiter, the two outputs of which are applied to a pair of inputs of a second complex multiplier, to another pair of inputs of which there are connected the outputs of the two said initial delay circuits, via a pair of additional delay circuits, each introducing a delay equal to the said mean delay, and the two outputs of the said second multiplier being connected respectively to one of the two inputs of two cancellers, having respectively on the other input the said two real and imaginary components of the video signal previously delayed by means of two further delay circuits, by a time equal to the said mean delay, and the outputs of the said cancellers finally constitute the output signal of the system in its two real and imaginary components.

* * * * *